(12) United States Patent
Hikita et al.

(10) Patent No.: US 8,858,081 B2
(45) Date of Patent: Oct. 14, 2014

(54) SLIDING BEARING

(75) Inventors: Yasuhiro Hikita, Toyota (JP); Norio Imai, Toyota (JP); Shinji Matsumoto, Toyota (JP); Kenji Watanabe, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 13/879,964

(22) PCT Filed: Oct. 28, 2011

(86) PCT No.: PCT/JP2011/074976
§ 371 (c)(1),
(2), (4) Date: Apr. 17, 2013

(87) PCT Pub. No.: WO2012/060301
PCT Pub. Date: May 10, 2012

(65) Prior Publication Data
US 2013/0216162 A1 Aug. 22, 2013

(30) Foreign Application Priority Data

Nov. 2, 2010 (JP) ................................. 2010-246435

(51) Int. Cl.
*F16C 17/12* (2006.01)
*F16C 33/10* (2006.01)

(52) U.S. Cl.
CPC ............. *F16C 17/12* (2013.01); *F16C 33/1065* (2013.01)
USPC ............. 384/26; 384/129; 384/283; 384/291; 384/420

(58) Field of Classification Search
CPC ............................ F16C 33/1065; F16C 17/12
USPC ........... 384/26, 129, 276, 286, 288, 293–294, 384/283, 291, 420
See application file for complete search history.

(56) References Cited

U.S. PATENT DOCUMENTS

| 4,400,099 | A | * | 8/1983 | Ehrentraut ..................... 384/283 |
| 4,561,787 | A | * | 12/1985 | Ehrentraut et al. ........... 384/295 |
| 5,620,262 | A | * | 4/1997 | Kumada et al. ................ 384/283 |
| 6,059,460 | A | * | 5/2000 | Ono et al. ...................... 384/322 |

(Continued)

FOREIGN PATENT DOCUMENTS

| JP | 03-249426 | 11/1991 | |
| JP | 07-269571 | 10/1995 | |
| JP | 07259862 A | * 10/1995 | .............. F16C 33/10 |
| JP | 10-259826 | 9/1998 | |

(Continued)

OTHER PUBLICATIONS

International Search Report for PCT/JP2011/074976 (2 pgs.).

*Primary Examiner* — Marcus Charles
(74) *Attorney, Agent, or Firm* — Flynn, Thiel, Boutell & Tanis, P.C.

(57) ABSTRACT

A sliding bearing includes a center portion and end portions on a bearing surface 1. Convexo-concave portions are respectively formed in the center portion and the end portions. The average height of the vertexes of convex portions 1A in the center portion is set smaller than the average height of the vertexes of convex portions 1B in the end portions. Average height $L_h$ of the convexo-concave portion 1A in the center portion and average height $L_H$ of the convexo-concave portions 1B in the end portions are set to the same height. The center portion may be formed flat.

6 Claims, 4 Drawing Sheets

(56) References Cited

U.S. PATENT DOCUMENTS

| | | | |
|---|---|---|---|
| 6,095,690 A * | 8/2000 | Niegel et al. | 384/293 |
| RE38,414 E * | 2/2004 | Katou et al. | 384/288 |
| 6,688,273 B2 * | 2/2004 | Ederer | 123/197.3 |
| RE38,791 E * | 9/2005 | Shibata et al. | 428/167 |
| RE39,377 E * | 11/2006 | Kumada et al. | 384/625 |
| 2012/0308168 A1 * | 12/2012 | Watanabe et al. | 384/276 |

FOREIGN PATENT DOCUMENTS

| | | | | |
|---|---|---|---|---|
| JP | 10-259827 | | 9/1998 | |
| JP | 2001165167 A | * | 6/2001 | ............. F16C 33/24 |
| JP | 2003-269454 | | 9/2003 | |
| JP | 2004211859 A | * | 7/2004 | ............. F16C 33/02 |
| JP | 2005-256965 | | 9/2005 | |
| JP | 2005256966 A | * | 9/2005 | ............. F16C 33/10 |

* cited by examiner

1: BEARING SURFACE

SLIDING BEARING

TECHNICAL FIELD

The present invention relates to a sliding bearing including a center portion and end portions on a bearing surface and, more particularly, to a sliding bearing including convexo-concave portions at least in end portions.

BACKGROUND ART

There has been well-known a sliding bearing including a center portion and end portions on a bearing surface, wherein a convexo-concave portion is formed in at least one of the center portion and the end portions (Patent Literature 1).

For example, FIG. 4 of Patent Literature 1 discloses a sliding bearing in which groove-like convexo-concave portions extending along the circumferential direction are respectively formed in a center portion and an end portion of a cylindrical bearing surface and a pitch in the center portion is set smaller than a pitch in the end portion.

FIG. 9 of Patent Literature 1 discloses a sliding bearing in which a groove-like convexo-concave portion extending along the circumferential direction is formed in an end portion of a cylindrical bearing surface but is not formed in a center portion and the surface of the center portion is formed flat.

Further, FIG. 11(a) of Patent Literature 1 discloses a sliding bearing in which groove-like convexo-concave portions extending along the circumferential direction are respectively formed in a center portion and an end portion of a cylindrical bearing surface and the depth of grooves in the end portion is set larger than the depth of grooves in the center portion.

PRIOR ART DOCUMENTS

Patent Literature

Patent Literature 1: Japanese Patent Application Laid-Open No. 2003-269454

SUMMARY OF INVENTION

Problems to be Solved by the Invention

In the configuration of Patent Literature 1, conformability, a cooling ability, and load resistance are taken into account. However, it is difficult to reduce friction.

The present invention provides a sliding bearing that can obtain small friction.

Means for Solving the Problems

That is, a first embodiment of the present invention is a sliding bearing including a center portion and end portions on a bearing surface, characterized in that convexo-concave portions are respectively formed in the center portion and the end portions, the average height of the vertexes of convex portions in the center portion is set smaller than the average height of the vertexes of convex portions in the end portions, and the average height of the convexo-concave portion in the center portion and the average height of the convexo-concave portions in the end portions are set to the same height.

A second embodiment of the present invention is a sliding bearing including a center portion and end portions on a bearing surface, characterized in that the surface of the center portion is formed flat, convexo-concave portions are formed in the end portions, the surface height of the center portion is set smaller than the average height of the vertexes of convex portions in the end portions, and the height of the surface in the center portion and the average height of the convexo-concave portions in the end portions are set to the same height.

Advantageous Effects of Invention

In the present invention, the average height of the vertexes of the convex portions in the center portion or the surface height of the flat surface in the center portion is set smaller than the surface height of the end portions. Therefore, it is possible to attain a reduction in friction of the center portion compared with the case in which both the heights are set the same or the case in which the heights are set opposite.

As in the invention of claim 1, the average height of the convexo-concave portion in the center portion and the average height of the convexo-concave portions in the end portions are set to the same height or, as in the invention of claim 2, the height of the surface in the center portion and the average height of the convexo-concave portions in the end portions are set to the same height. Therefore, it is possible to attain both of improvement of conformability and an increase in a load capacity in the end portions. Consequently, it is possible to attain a reduction in friction without sacrificing the conformability and the load capacity.

MODE FOR CARRYING OUT THE INVENTION

Figure 1:
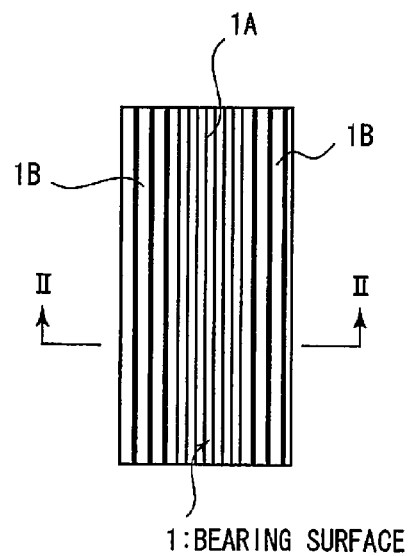
FIG. 1 is an exploded view of a sliding bearing showing a first embodiment of the present invention.
Figure 2:
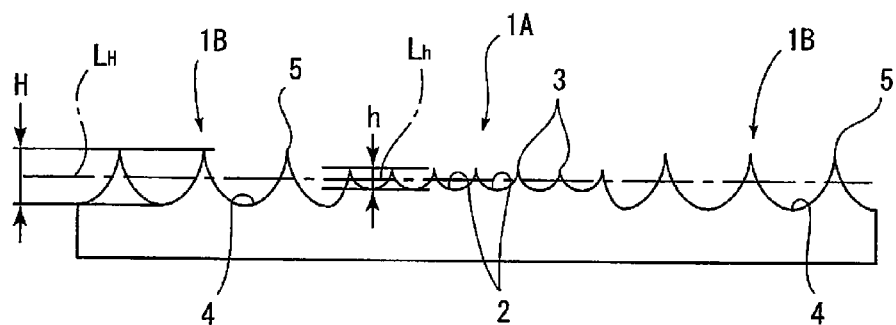
FIG. 2 is an enlarged sectional view taken along line II-II in FIG. 1.

The present invention is explained below concerning embodiments. FIG. 1 is an exploded view of a journal sliding bearing, a bearing surface 1 of which is the inner surface of a cylindrical member. A convexo-concave portion 1A is formed in a center portion of the bearing surface 1. Convexo-concave portions 1B are formed in end portions on both sides of the bearing surface 1 as well. FIG. 2 is an enlarged sectional view taken along line II-II in FIG. 1. The convexo-concave portion 1A in the center portion and the convexo-concave portions 1B in the end portions are exaggeratedly shown.

The convexo-concave portion 1A in the center portion is formed by a large number of spiral grooves 2 continuous in the circumferential direction cut by, for example, boring. Ridge portions 3 are formed among the respective grooves 2. Height differences h of the convexo-concave portion 1A, i.e., heights from the bottoms of the grooves 2 to the vertexes of the ridge portions 3 are formed to be substantially the same one another.

The convexo-concave portions 1B in the end portions are also formed of a large number of spiral grooves 4 continuous in the circumferential direction cut by boring. Ridge portions 5 are formed among the respective grooves 4. Height differences H of the convexo-concave portions 1B, i.e., heights from the bottoms of the grooves 4 to the vertexes of the ridge portions 5 are also formed to be substantially the same one another. Note that the grooves 2 and 4 do not always need to be spiral. The respective grooves 2 and 4 may be independent annular grooves.

The height differences h of the convexo-concave portion 1A in the center portions are set to be smaller than the height differences H of the convexo-concave portions 1B in the end portions. Average height $L_h$ in the convexo-concave portion 1A in the center portion and average height $L_H$ in the convexo-concave portions 1B in the end portions are set to be the same degree.

The average height $L_h$ in the convexo-concave portion 1A in the center portion means a height position in the center between the average height formed by the vertexes of a large number of ridge portions 3 of the convexo-concave portion 1A and the average height formed by a large number of bottoms of the grooves 2 of the convexo-concave portion 1A. The average height $L_H$ in the convexo-concave portions 1B in the end portions means a height position in the center between the average height formed by a large number of vertexes of the ridge portions 5 of the convexo-concave portions 1B and the average height formed by a large number of bottoms of the grooves 4 of the convexo-concave portions 1B.

An opposite-side member axially supported by the sliding bearing is a rotating shaft (not shown in the figure), the outer circumferential surface of which is columnar. Therefore, if the average height $L_h$ in the convexo-concave portion 1A in the center portion and the average height $L_H$ in the convexo-concave portions 1B in the end portions are set to be the same degree, the average height $L_h$ in the convexo-concave portion 1A in the center portion and the average height $L_H$ in the convexo-concave portions 1B in the end portions are set to be substantially the same distances from the rotation center of the rotating shaft.

Therefore, the surface height in the convexo-concave portion 1A in the center portion (the height of an imaginary cylinder surface formed by making the average height formed by the vertexes of the large number of ridge portions 3 continuous) is set in a position lower than the surface height of the convexo-concave portions 1B in the end portions (height of an imaginary cylinder surface formed by making the average height formed by the vertexes of the large number of ridges portions 5 continuous) (a position far from the rotation center of the rotating shaft).

On the other hand, the height of an imaginary cylinder surface formed by connecting the bottoms of the large number of grooves 2 in the convexo-concave portion 1A in the center portion is set in a position higher than the height of an imaginary cylinder surface formed by connecting the bottoms of the large number of grooves 4 in the convexo-concave portions 1B in the end portions (a position close to the rotation center of the rotating shaft).

Figure 3:
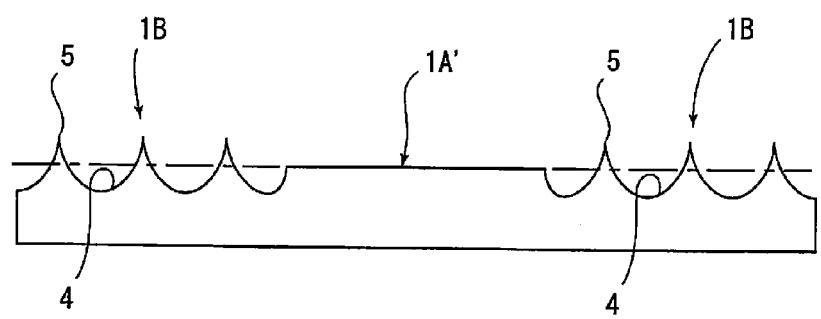
FIG. 3 is a sectional view showing a second embodiment of the present invention.

FIG. 3 shows a second embodiment of the present invention. In this embodiment, the center portion in the first embodiment is formed as a flat surface 1A' and a height position of the flat surface 1A' is set to the same degree as an average height position in the convexo-concave portions 1B in the end portions. The other sections are configured the same as the sections in the first embodiment.

In this case, as in the first embodiment, the surface height of the flat surface 1A' in the center portion is smaller than the height of the vertexes of the ridge portions 5 in the convexo-concave portions 1B in the end portions and larger than the height of the bottom portions of the grooves 4 in the convexo-concave portions 1B in the end portions.

Figure 4:
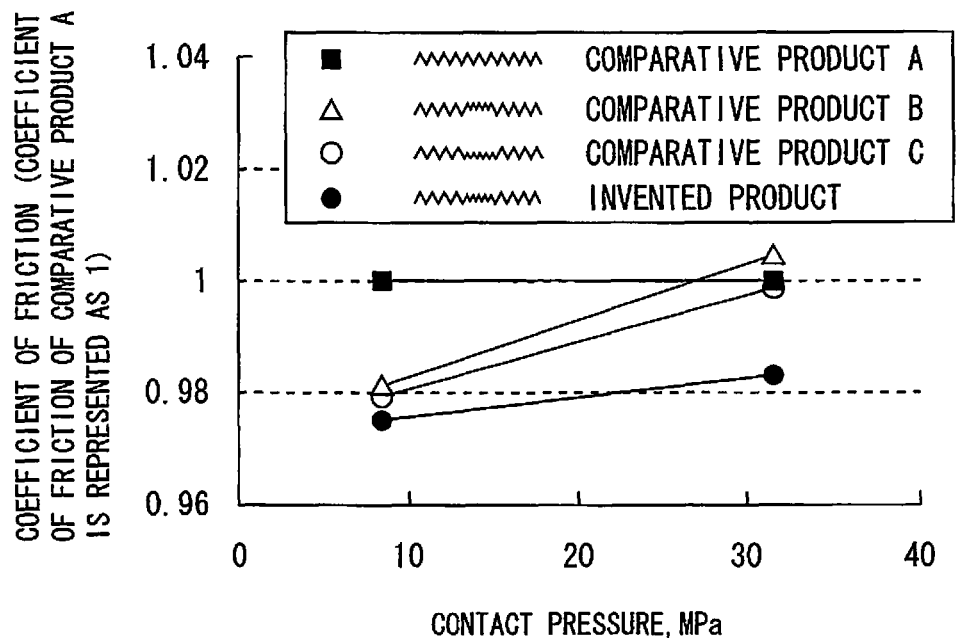
FIG. 4 is a diagram of test results obtained by measuring the magnitude of a coefficient of friction.

FIG. 4 shows, concerning the invented product shown in FIG. 2, test results obtained by measuring the magnitude of a coefficient of friction (friction). In the test, a test result of the invented product is indicated by black circles.

A comparative product A is a product in which the grooves 4 formed in the convexo-concave portions 1B in the end portions in FIG. 2 are formed over an entire bearing surface. In the test, a test result of the comparative product A is indicated by black squares. A coefficient of friction of the comparative product A is represented as 1.

A comparative product B is a product in which the surface height of the convexo-concave portion 1A in the center portion in FIG. 2 is formed to be the same height as the surface height of the convexo-concave portions 1B in the end portions. That is, the average height of the vertexes of the ridge portions 3 in the convexo-concave portion 1A in the center portion and the average height of the vertexes of the ridge portions 5 in the convexo-concave portions 1B in the end portions are set to be substantially the same heights. Therefore, the average height $L_h$ in the convexo-concave portion 1A in the center portion is larger than the average height $L_H$ in the convexo-concave portions 1B in the end portions. In the test, a test result of the comparative product B is indicated by white triangles.

A comparative product C is a product in which the average height of the bottoms of the grooves 2 in the convexo-concave portion 1A in the center portion is formed to be the same height as the average height of the bottom of the grooves 4 in the convexo-concave portions 1B in the end portions. Therefore, the average length $L_h$ in the convexo-concave portion 1A in the center portion is smaller than the average height $L_H$ in the convexo-concave portions 1B in the end portions. In the test, a test result of the comparative product C is indicated by white circles.

In these products, the convexo-concave portions 1B in the end portions are provided in a range of ⅛ from the respective ends with respect to the bearing surface of the sliding bearing. Therefore, the convexo-concave portions 1B in the end portions as a whole are provided in a range of ¼.

As it is understood from the test results in FIG. 4, the coefficient of friction in the invented product indicates a satisfactory result with respect to the comparative products. In particular, in the invented product, a more satisfactory result is obtained than the comparative products when contact pressure increases.

A reason why the test result in FIG. 4 is obtained is considered as explained below.

That is, when contact pressure applied to the sliding bearing is not high, since the convexo-concave portions 1B in the end portions are provided, it is possible to suppress a side flow of a lubricant. Therefore, oil film pressure of the sliding bearing is in a sufficiently large state with respect to the contact pressure. It is possible to lift the shaft from the surface of the sliding bearing. Further, in the comparative product C and the invented product, the surface height and the average height $L_h$ in the convexo-concave portion 1A in the center portion are respectively smaller than the surface height and the average height $L_H$ in the convexo-concave portions 1B in the end portions. Therefore, the surface of the shaft is in a state further away from the surface of the sliding bearing. Therefore, friction in the center portion decreases.

However, during high contact pressure, a load applied to the shaft increases and a lifting amount of the shaft decreases. Therefore, the magnitude of friction is different in each of the comparative products B and C and the invented product.

In the comparative product B during the high contact pressure, since the average height $L_H$ of the convexo-concave portions 1B in the end portions is small, a side flow suppression effect for the lubricant is small. Therefore, the lifting amount of the shaft further decreases, the shaft and the sliding bearing surface are in a close state in the center portion, and the friction in the center portion increases.

On the other hand, in the comparative product C, since the average height $L_H$ of the convexo-concave portions 1B in the end portions is large, when the lifting amount of the shaft is small during the high contact pressure, contact occurs between the shaft and the sliding bearing in the end portions and the friction increases.

Contrary to the above, in the invented product, since both of securing of the oil film pressure and avoidance of contact in the end portions can be attained even during the high contact pressure, it is possible to minimize the friction as a whole.

Figure 5:
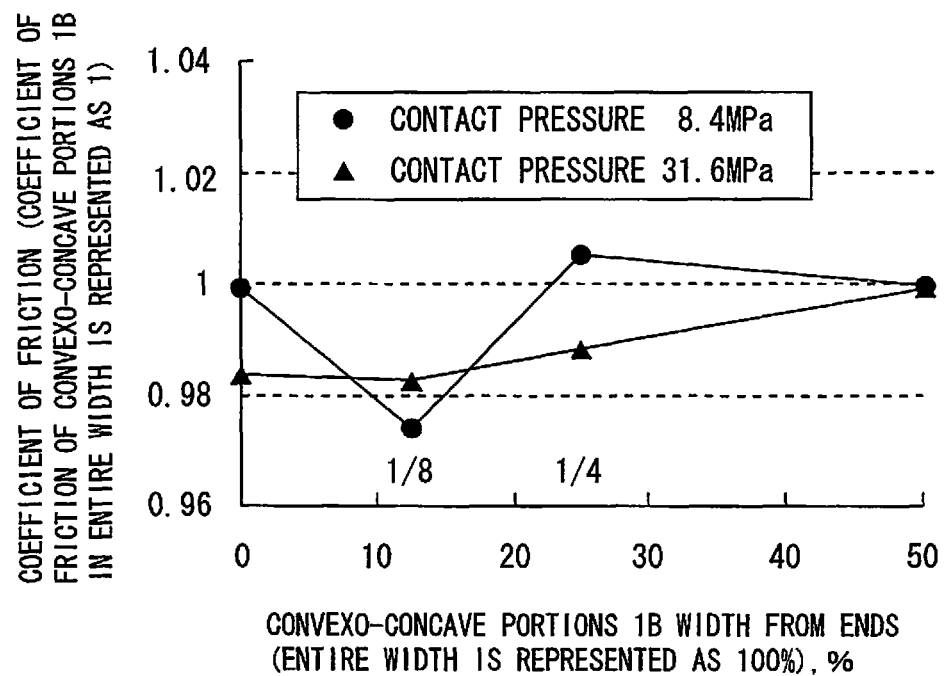
FIG. 5 is a diagram of test results obtained by measuring a change in a coefficient of friction in the case in which the width of convexo-concave portions 1B in end portions is changed.

FIG. 5 shows, concerning the invented product, test results obtained by measuring a change in a coefficient of friction in the case in which the width of the convexo-concave portions 1B in the end portions is changed. In the test, the coefficient of friction of the comparative product A is also represented as 1.

In the test, the test is performed concerning the case in which the convexo-concave portions 1B in the end portions are not formed (the entire bearing surface is formed by the convexo-concave portion 1A in the center portion), the case in which the convexo-concave portions 1B are formed by ⅛ from the respective ends of the bearing surface, the case in which the convexo-concave portions 1B are formed by ¼ from the respective ends, and the case in which the convexo-concave portions 1B are formed over the entire bearing surface (formation width of the convexo-concave portions from the respective ends is 50%). In FIG. 5, a black circle sign indicates the case in which the contact pressure is set to 8.4 MPa and a black triangle sign indicates the case in which the contact pressure is set to 31.6 MPa.

As it is understood from the test results, a satisfactory result is obtained when the convexo-concave portions 1B in the end portions are formed by ⅛ from the respective ends of the bearing surface. In particular, even when the contact pressure is low, it is possible to reduce the friction in the center portion while securing the side flow suppression effect in the end portions of the sliding bearing.

Figure 6:
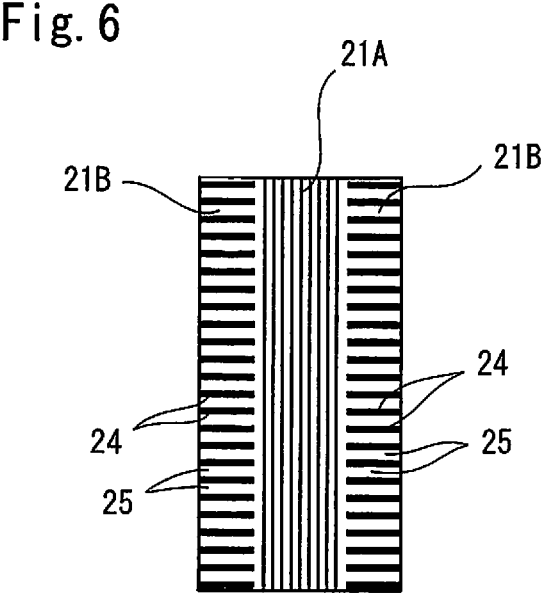
FIG. 6 is a sectional view showing a third embodiment of the present invention.

FIG. 6 shows a third embodiment of the present invention. A center portion 21A in this embodiment are formed in a convexo-concave shape, which is the same shape as the center portion in the first embodiment. On the other hand, in end portions 21B on both sides in this embodiment, convexo-concave portions are formed by a large number of grooves 24 formed in a direction orthogonal to the circumferential direction and ridge portions 25 formed among the respective grooves 24.

In the end portions 21B in this embodiment, the convexo-concave portions are formed by the large number of grooves 24 and the ridge portions 25. However, the average height of the convexo-concave portions is set to be the same height as the average height of the convexo-concave portions in the center portion 21A. The average height of the vertexes of the convex portions in the center portion 21A is set to be lower than the average height of the vertexes of the convex portions in the end portions 21B.

Further, although not shown in the figure, as a modification of the third embodiment, as in the second embodiment, the surface of the center portion 21A may be formed flat.

In these configurations, action and effect equivalent to those in the first embodiment and the second embodiment can be obtained.

Figure 7:
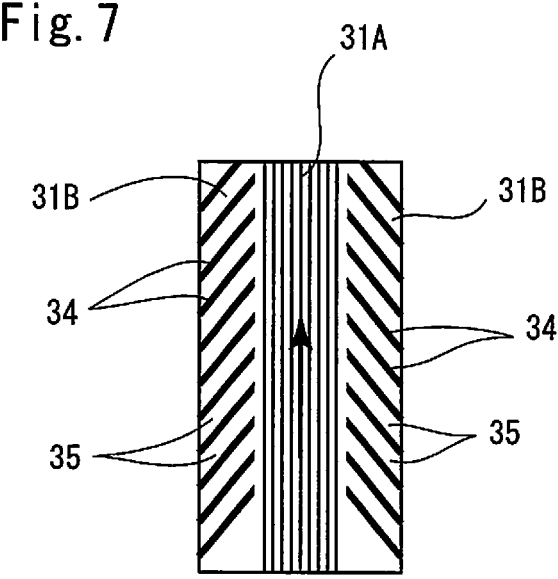
FIG. 7 is a sectional view showing a fourth embodiment of the present invention.

FIG. 7 shows a fourth embodiment of the present invention. A center portion 31A in this embodiment is formed in a convexo-concave shape, which is the same shape as the center portion in the first embodiment. On the other hand, in end portions 31B on both sides in this embodiment, convexo-concave portions are formed by a large number of oblique grooves 34 formed in a direction obliquely crossing the circumferential direction and ridge portions 35 formed among the respective grooves 34. The grooves 34 and the ridge portions 35 are formed to incline such that center portion sides thereof face a rotating direction of an opposite-side shaft indicated by an arrow.

In the end portions 31B in this embodiment, the convexo-concave portions are formed by the large number of oblique grooves 34 and the ridge portions 35. However, the average height of the convexo-concave portions is set to be the same height as the average height of the convexo-concave portions in the center portion 31A. The average height of the vertexes of the convex portions in the center portion 31A is set to be lower than the average height of the vertexes of the convex portions in the end portions 31B.

Although not shown in the figure, as a modification of the fourth embodiment, as in the second embodiment, the surface of the center portion 31A may be formed flat.

In these configurations, action and effect equivalent to those in the first embodiment and the second embodiment can be obtained.

Figure 8:
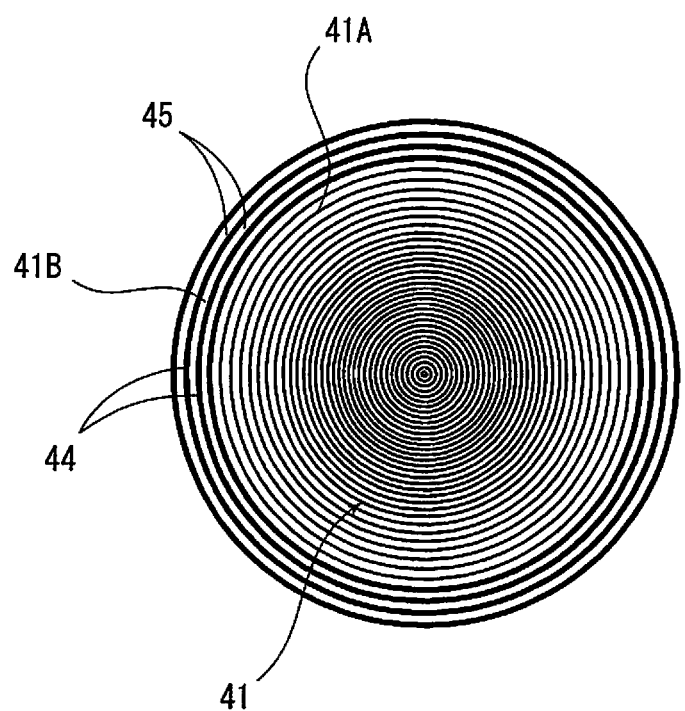
FIG. 8 is a sectional view showing a fifth embodiment of the present invention.

FIG. 8 shows a fifth embodiment of the present invention. All the embodiments explained above relate to the journal sliding bearing, the bearing surface of which is the inner surface of the cylindrical member. However, a bearing surface 41 in this embodiment is a thrust bearing surface formed on the surface of a disk-like member.

A center portion 41A of the circular bearing surface 41 is formed in a convexo-concave shape, which is the same shape as the center portion 1A in the first embodiment, in the radial direction. The outer circumferential portion of the circular bearing surface 41 is formed as an end portion 41B. The end portion 41B is formed in a convexo-concave shape by spiral or concentric grooves 44 continuous along the circumferential direction of the disk-like member and ridge portions 45 among the respective grooves.

In the end portion 41B in this embodiment, the average height of the convexo-concave portion is set to be the same height as the average height of the convexo-concave portions in the center portion 41A. The average height of the vertexes of the convex portions in the center portion 41A is set to be lower than the average height of the vertexes of the convex portions in the end portion 41B.

Further, although not shown in the figure, as a modification of the fifth embodiment, as in the second embodiment, the surface of the center portion 41A may be formed flat. The shape of the end portion 41B may be the shape of the end portions shown in FIGS. 6 to 8.

In such a configuration, action and effect equivalent to those in the first embodiment and the second embodiment can be obtained.

REFERENCE SIGNS LIST 1, 41 bearing surfaces
1A, 21A, 31A, 41A convexo-concave portions of center portions
1B, 21B, 31B, 41B convexo-concave portions of end portions
2, 4, 24, 34, 44 grooves
3, 5, 25, 35, 45 ridge portions

The invention claimed is:

1. A sliding bearing comprising a center portion and end portions on a bearing surface, characterized in that
convexo-concave portions are respectively formed in the center portion and the end portions, the average height of vertexes of convex portions in the center portion is set smaller than the average height of vertexes of convex portions in the end portions, and the average height of the convexo-concave portion in the center portion and the average height of the convexo-concave portions in the end portions are set to same height.

2. The sliding bearing according to claim 1, characterized in that the bearing surface of the sliding bearing is a journal bearing surface formed on an inner surface of a cylindrical member, and both ends of the journal bearing surface are the end portions.

3. The sliding bearing according to claim 1, characterized in that the bearing surface of the sliding bearing is a thrust bearing surface formed on a surface of a disk-like member, and an outer circumferential portion of the circular thrust bearing surface is the end portion.

4. The sliding bearing according to claim 1, characterized in that the convexo-concave portion is formed by a large number of grooves formed in parallel to one another.

5. The sliding bearing according to claim 4, characterized in that the large number of grooves are formed in any one of the directions of a direction parallel to, a direction orthogonal to, and a direction obliquely crossing a sliding direction against an opposite-side member.

6. A sliding bearing comprising a center portion and end portions on a bearing surface, characterized in that
a surface of the center portion is formed flat, convexo-concave portions are formed in the end portions, the surface height of the center portion is set smaller than the average height of vertexes of convex portions in the end portions, and the height of the surface in the center portion and the average height of the convexo-concave portions in the end portions are set to the same height.

* * * * *